United States Patent
Ely

[11] 3,925,331
[45] *Dec. 9, 1975

[54] POLYMERIC SEALANTS

[75] Inventor: Christopher Scott Ely, Oldbury, England

[73] Assignee: Albright & Wilson Ltd., Oldbury, England

[*] Notice: The portion of the term of this patent subsequent to Mar. 18, 1992, has been disclaimed.

[22] Filed: Nov. 27, 1973

[21] Appl. No.: 419,378

Related U.S. Application Data

[63] Continuation-in-part of Ser. No. 410,700, Oct. 29, 1973, Pat. No. 3,872,059, which is a continuation of Ser. No. 259,935, June 5, 1972, abandoned.

[30] Foreign Application Priority Data

June 3, 1971 United Kingdom............ 18910/71
Dec. 1, 1972 United Kingdom............ 55695/72

[52] U.S. Cl.......... 260/79; 260/46.5 E; 260/46.5 G; 260/79.1; 260/824 R; 260/824 EP
[51] Int. Cl.² ................ C08G 75/14; C08G 75/16
[58] Field of Search... 260/79, 79.1, 46.5 E, 46.5 G, 260/824 R, 824 EP

[56] References Cited
UNITED STATES PATENTS

| | | | |
|---|---|---|---|
| 3,317,461 | 5/1967 | Plueddemann | 260/79 |
| 3,476,826 | 11/1969 | Millen | 260/79.1 |
| 3,714,132 | 1/1973 | Nakanishi et al. | 260/79 |
| 3,717,617 | 2/1973 | Marrs et al. | 260/79 |

*Primary Examiner*—Melvyn I. Marquis
*Attorney, Agent, or Firm*—Flynn & Frishauf

[57] ABSTRACT

A moisture curable sealant composition in the absence of polysulphide curing agents which comprises the product of reacting under anhydrous conditions a polysulphide of formula

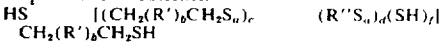

where $a$ is 1–5, $b$ is 0 or 1, $c$ is 1–200 $d$ is 0–0.05c and $0.05c \geq f \geq d$, $1 \geq f$ and $f$ is $d$ times (No. of free valencies in $R'' - 2$), $R'$ is O, S, or divalent saturated radical consisting of CH and optionally O and/or S in COC, CSC or OH links, $R''$ is an at least trivalent saturated radical consisting of CH and optionally O and/or S in COC, CSC or OH links, with a silane of formula $Q_n SiX_{4-n}$ where $n$ is 1 or 2, Q is organic group containing an epoxide or mercapto group, $CH_2=CR_{14}COO\ C_{m+1}H_{2m+2}$—or $CH_2 = CR_{15}-C_m\ H_{2m}-$, where $m$ is 0, 1, 2 or 3 and $R_{14}$ and $R_{15}$ are hydrogen or $C_{1-4}$ alkyl, at least 2X are organic hydrolizable groups and the remaining X (if any) is $C_{1-6}$ alkyl or chloroalkyl, the silane having 1 or 2 groups capable of reaction with SH, the silane reacting with 3–30% of the SH groups of the polysulphide, and the reaction with the mercapto silane occurring in the presence of a base of pK at least 9. The sealant composition when formulated with fillers, and optionally plasticizers, curing catalysts and curing inhibitors is cured with moisture to give a product having an extensibility of 50–200% and recovery of at least 75%.

41 Claims, No Drawings

POLYMERIC SEALANTS

This application is a continuation in part application of my application Ser. No. 410,700 filed Oct. 29th 1973 now U.S. Pat. No. 3,872,059 which is a continuation of my application Ser. No. 259,935 filed June 5th 1972 now abandoned.

The present invention relates to polysulphide sealing compositions which can be employed as one pack sealants.

Hitherto although one pack polysulphide sealants are available they are very slow to cure and it has been normal in the construction and other industries where high performance polysulphide sealant compositions are employed to use two pack sealants, that is to say the actual composition employed is obtained by mixing two ingredients (which may themselves be mixtures) on site immediately prior to use. For example polysulphides can be mixed with a curing or cross linking agent. Satisfactory sealing is then obtained by reaction between these ingredients. This may present problems in operation, if only because of the difficulty of ensuring that the ingredients are mixed in the correct proportions and sufficiently thoroughly by unskilled or semi-skilled construction workers.

It would therefore obviously be desirable to produce a sealant which does not require on-site mixing but which can be employed directly as it comes out of its packaging and will cure automatically and rapidly under atmospheric conditions. There has not hitherto been produced such a composition which will exhibit sufficient good extension and recovery in the seal after 7 days exposure to air at room temperature and 50% relative humidity to comply with the demands of various national standard or construction industry test specifications.

In U.S. Pat. No. 3317461 there is described a polysulphide composition which, it is stated may be employed as a sealant or as a rubber. It is stated that in order to obtain satisfactory results, it is necessary to incorporate into each polysulphide chain two silicon atoms which have an average of at least 1.5 hydrolysable groups attached to them. Such compounds are obtained by the reaction of polysulphide chains with di- or tri-alkoxysilanes, such silanes containing an unsaturated carbon - carbon bond, or other group capable of reacting with polysulphide polymer such as an epoxy group These compounds are stated to be curable when exposed to moisture although for many of them a curing catalyst, such as a tin salt or a titanium compound, may be required. Such formulations have not, however, found use as sealants possibly as a result of the high cost of silicon compounds. The exemplified compounds are not satisfactory as sealants because the high proportion of Silicon atoms per molecule results on moisture curing in giving a product having insufficient inextensibility. We have now found that it is possible to obtain satisfactory sealant compositions, which comprise a polysulphide reacted with substantially fewer silicon atoms than the number required to provide two for every polysulphide molecule, providing that the composition excludes substantially all tin compounds (or other compounds eg. inorganic dioxides or peroxides) which are capable of curing SH terminated polysulphides under the reaction conditions in the absence of moisture. This exclusion is necessary because if less than 2 silicon atoms are employed per polysulphide molecule there is inevitably left a number of free -SH groups on the molecule. These tend to react with the tin compounds (or other compounds) to cause curing in the packaging and resulting in the composition being unsuitable for use.

The present invention provides a sealant composition maintained under anhydrous conditions, containing unreacted SH groups and in the absence of peroxides, and tin compounds (or other compounds) capable of curing SH terminated polysulphides under the reaction conditions specified hereinafter in the absence of moisture, said sealant comprising the product of reacting under anhydrous conditions a polysulphide of the statistical formula

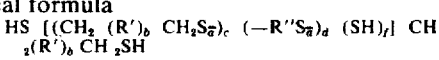

HS [($CH_2$ ($R'$)$_b$ $CH_2S_a$)$_c$ (—$R''S_a$)$_d$ (SH)$_f$] $CH_2$($R'$)$_b$ $CH_2SH$ where $a$ is 1–5, preferably 1–3 and especially 2–3 and need not necessarily be an integer, $b$ is 0 or 1

$c$ is 1–200, preferably 20–100

$d$ is 0 up to $0.05c$, preferably $0.001c$–$0.05c$.

$f$ is subject to the conditions $0.05c \geq f \geq d$, $1 \geq f$ and $f = d$ times the (No. of free valencies in $R'' - 2$).

$R'$ is —O—, s- or an organic divalent radical free of aliphatic unsaturation consisting of C and H and optionally O and/or $S_a$, in the form of —C—O—C—, —OH or —C—$S_a$—C— links, $R''$ is an organic radical free of aliphatic unsaturation and having at least 3 free valencies and consisting of C and H and optionally O and/or $S_a$ in the form —C—O—C, —OH or —C—$S_a$—C— links, and the free valencies being for carrying all the $f$ SH groups and the $CH_2R'_b$ $CH_2S_a$ and $R''S_a$ groups being in any order, with a silane of the formula $Q_n$ Si $X_{(4-n)}$ where $n$ is 1 or 2, Q is an organic group having an epoxide group (preferably a terminal epoxide group), an organic group having a mercapto group (preferably terminal mercapto group), $CH_2 = CR_{14}COO$ $C_{m+1}H_{2m+2}$ — or $CH_2 = CR_{15}$ —$C_m$ $H_{2m}$ — group, where $m$ is 0,1,2 or 3, each of $R_{14}$ and $R_{15}$ which are the same or different, is hydrogen or is an alkyl radical of 1 to 4 carbon atoms, preferably methyl, (with $R_{14}$ preferably methyl and $R_{15}$ preferably hydrogen) and at least two X's are organic hydrolyzable groups and the remaining group X (if any) is an alkyl group of 1 to 6 carbon atoms, preferably methyl, or a chloro alkyl radical of 1 to 6 carbon atoms, the silane having a total of only 1 or 2 groups, which react with SH in the polysulphide under the reaction conditions, the reaction being carried out at a temperature and for a time and using a quantity of silane such that for the silane in question the proportion of the SH groups of the polysulphide which react with the silane is from 3% to 30% and the reaction with a silane containing a mercapto group being carried out with presence of a base having a pK of at least 9.

In the polysulphide, the $c$ and $d$ repeating units are joined in any order with the polymer having linear or linear and branched chains, the f SH groups being attached to free valencies in the combined $c/d$ units whether those valencies are on the $c$ or $d$ units.

Preferably $R'$ is the organic divalent radical, especially one with a linear chain. It preferably has less than 8 carbon atoms, 0–4 oxygen atoms and 0–4 $S_a$ groups and is usually aliphatic; the oxygen and/or sulphur atoms are preferably present in C—O—C or C—$S_a$—C groups Examples for $R'$ are —$CH_2OCH_2$—, —$CH_4O$—, —$CH_2CH_2$ $OCH_2$—, —$CH_2S$ $CH_2SCH_2$—, —$CH_2S$ $CH_2$—, $(CH_2)_3$ O $CH_2O$ $(CH_2)_3$ — and most preferred —$CH_2O$ $CH_2O$ $CH_2$—.

Preferably R'' has less than 10 carbon atoms and 0–4 oxygen and 0–4$S_a$ groups and is usually aliphatic. R'' usually has 2 terminal $CH_2$ - groups. Examples of suitable groups for R'' are $-CH_2CH\ CH\ CH_2-$,

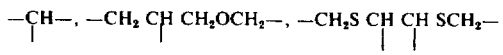

but most especially $-\ CH_2\ -CH-CH_2-$.

R'' is usually trivalent.

The preferred range for $d$ is 0.001c to 0.005c and that for $f$ is 0.001c–0.005c. Preferred absolute values for $f$ for values of c of 20–100 are 0.001–0.2 i.e. a total of 2.001–2.2 SH groups per molecule. Typically polysulphides for use in sealant compositions according to the invention will contain $-S-S$, $S-S-S$, $S-S-S-S-$,

and/or

Linkages. Compounds which are particularly of use are those having $-S-S-$ or both $S-S$ and $-S-$ linkages, in particular those containing a multiplicity of ($CH_2\ CH_2\ O\ CH_2\ O\ CH_2\ CH_2\ S_2$) groups. Compounds for use in the compositions of the present invention frequently contain from 20 to 85, especially 40–60 such groupings though 20–50 or 40–85 of such grouping may be preferred.

Preferred polysulphides are those of formula
HS [($CH_2\ CH_2\ OCH_2OCH_2CH_2SS$)$_c$ ($CH_2CH\ CH_2SS$)$_d$ ($SH$)$_d$] $CH_2CH_2OCH_2\ OCH_2\ CH_2CH_2SH$ Compounds of this formula are described in U.S. Pat. No. 2466963 and some are commercially available, examples available from Thiokol Chemical Corporation of Trenton New Jersey being designated LP31, LP2 and LP32. The characteristics of these polymers are as follows.

trimethoxy silyl, triethoxy silyl, methyldimethoxy silyl groups. Preferred silanes containing an epoxide group are of formula $Q_n\ SiX_{4-n}$, where $n$ and X are as defined above and Q is of formula

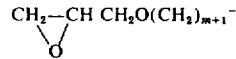

or epoxycyclo hexyl alkylene of 1–4 carbon atoms in the alkylene group e.g. 3,4epoxy cyclo hexylethyl. Examples of silanes containing epoxy groups are 3-glycidoxy - 1 - (trialkoxysilyl) propanes and 3,4-epoxycyclohexylethyl-trialkoxy-silanes in which the alkoxy groups have 1 to 6 carbon atoms, e.g. the tri methoxy and triethoxy compounds. A mixture of silanes can be used if desired.

The group Q can also contain as reactive component a mercapto group, which may be present in an aliphatic or aromatic group. Preferably the group Q contains 1 SH group, preferably attached to an aliphatic group such as an alkyl group eg. of 1 to 6 carbon atoms. Preferred SH containing groups Q are of formula HS $C_{m+1}$ $H_{2m+2}$, where $m$ is 0,1,2 or 3, especially those of formula HS $(CH_2)_{m+1}-$, such as 3- mercaptopropyl. The groups X are as described for the other reacting silanes but trialkoxy groups and alkyl dialkoxy groups (especially with 1 to 6 carbon atoms in each alkyl or alkoxy group) are preferred for the X part of the silane of formula $QSiX_3$. Examples of SH containing silanes are 3 - mercaptopropyl - trimethoxy silane, 3 - mercaptopropyl - triethoxy silane, 3 - mercapto propyl - methyl-di (ethoxy) silane and 3 - mercaptopropyl-methyl-di (methoxy) silane. The reaction of the polysulphide with the SH containing silane is carried out in the presence of a base of pKa of least 9 e.g an organic base, for example an amine. The preferred type of amine is a tertiary one preferably one in which the carbon atoms bonded directly to the nitrogen atom are aliphatic. The amine

| Designation | c | d | Wt.cross link(i.e.d/c)% | Molec.Wt |
|---|---|---|---|---|
| LP 31 | 40 – 46 | 0.2–0.23 | 0.5 | ca 7500 |
| LP 2 | 23 | 0.48 | 2 | 4000 |
| LP 32 | 23 | 0.12 | 0.5 | 4000 |
| LP 12 | 23 | 0.025 | 0.1 | 4000 |

Polysulphides of the above formula can also be prepared as described by Eugene R. Bertozzi in Rubber Chem. Tech. 41, (1) 114-160, 1968.

The preferred silanes are those with vinyl groups for Q and are exemplified by vinyl tri alkoxy silanes and vinyl alkyl di(alkoxy) silanes where each alkyl and alkoxy group has 1-6 carbon atoms, e.g. vinyltriethoxy silane, vinyl trimethoxy silane, vinyl methyl diethoxy silane, vinyl methyl dimethoxy silane and vinyl hexyl diethoxy silane. Preferred silanes with vinylic ester groups are 3 - (trialkoxy silyl) propyl methacrylates and 3 - (alkyl di (alkoxy) silyl) propyl methacrylates, with 1 to 6 carbon atoms in each alkyl and alkoxy group, especially 1 or 2 carbon atoms e.g. the propyl methacrylates with as substituent in the 3 position of the propyl group preferably has a boiling point greater than 120°C. The use of the less volatile amines enables the product to be substantially free of the smell of the base.

The preferred amines are those of formula $NR_{16}R_{17}R_{18}$ wherein at least one of $R_{16}$ $R_{17}$ and $R_{18}$ is on alkyl group of at least 6 carbon atoms, preferably of 6-12 carbon atoms, a cyclohexyl or aralkyl group, the remainder, if any, being alkyl groups of 1 to 5 carbon atoms with the proviso that the amine contains a total of at least 9 carbon atoms, or $R_{16}$ and $R_{17}$ together with the nitrogen atom to which they are attached form a heterocyclic ring, optionally with at least one N, S or O atom in the ring, preferably a piperidine ring. Examples of the aralkyl group are benzyl and [2 - hydroxy -3, 5 bis (dialkyl aminomethyl)] benzyl, especially when the alkyl group is of 1 to 6 carbon atoms such as a methyl group. Examples of suitable amines are N,N - dimethyl benzylamine, trinonylamine, trihexylamine, tri cyclohexylamine, tripropylamine, N-methylpiperidine and 2,4,6 - tris (dimethylaminomethyl) phenol. An alkali metal alkoxide of 1 to 6 carbon atoms eg one of sodium or potassium with methanol or ethanol can also be used as the base in the SH containing silane reaction.

Preferably in the silane n is 1 and there are 2 or 3 hydrolyzable groups. The hydrolyzable groups are preferably free of groups capable of reacting under the reaction conditions with -SH, eg ethylene, acetylene, epoxide, ketone or aldehyde groups. Such reactive groups may be present in X so long as they react with SH under the reaction conditions for the particular silane to an extent of less than 10% of that of the group Q in that silane. The hydrolyzable groups are preferably alkoxy groups each of 1 to 6 carbon atoms or acyloxy groups, such as those of alkanoic acids of 2 to 8 carbon atoms eg acetoxy or propionoxy groups, or hydrocarbyl isocyanoxy groups which are derived from ketones eg 3 to 10 carbon atoms such as acetoxime and cyclohexanonoxime. When $n$ is 1 and there are only 2 hydrolyzable groups for X, the remaining X group is preferably a methyl group.

The silane are reacted with the polysulphides in amounts so as to react with up to 30% of the -SH groups present in the polymer. The amount of silicon compound, which it will be necessary to employ, to produce reactions to this extent will depend upon the reactivity of the particular silicon compound. For example employing a reactive compound such as a glycidoxy compound eg 3-glycidoxy-(1-trimethoxy silyl-) propane it may be possible to use amounts of no more than 0.3 mole of silicon compound equivalent per SH group, whereas for less reactive compounds such as vinyl silanes eg vinyl triethoxy silane amounts of up to 1.5 moles of silicon compound equivalent per SH group may be required.

It should be understood that in the method hereinafter described in many cases eg with the less reactive silanes only a small proportion of the silicon compound employed actually reacts with the SH groups available. We have, however, found that there is a certain critical minimum amount of silicon compound which must have reacted with the polymer in order to obtain a composition which will cure satisfactorily. The amount of silicon which has, in fact, reacted with the polysulphide polymer may be determined by the method described by B Saville in Analyst 86 (1961) modified to keep the polymer in dispersion.

The silanes can be caused to react with the polysulphides by reacting the polysulphide in a suitable solvent or alone with the silane, under substantially anhydrous conditions. The temperature and time required for satisfactory addition will of course depend upon the reactivity of the silane. If desired, an accelerator may be employed to assist in this reaction, for example organic peroxides, such as benzoyl, lauroyl or cyclohexanone peroxides, in an amount of less than 0.2% based on the weight of the polysulphide or other catalysts e.g. NN,-diethyl aniline, pyridine or sulphur, in amounts of up to 3% e.g. 0.01-3% based on the weight of the polymer. If peroxides are used, they are substantially absent at the end of the reaction.

The quantity of silane and the time and temperature of the reaction, required to react the desired proportion of SH groups depends on the reactivity of the silane. For a given silane the quantity and conditions can readily be ascertained by trial and error using the method of analysis referred to above.

Thus for example where the Q group in the silane is of formula $CH_2 = CH(CH_2)_m$ e.g. as in vinyl tri ethoxy silane or vinylethyl di methoxy (or ethoxy) silane, 3–10% of the SH groups of polysulphides of molecular weight 4,000–10,000 can be reacted by heating for 8–25 hr at 80°–120°C with an amount of silane in the molar ratio to thiol in the polysulphide of 0.5 : 1 to 1.5 : 1. Addition of 0.001–3% by weight of catalyst e.g. an amine such as pyridine or sulphur enhances the amount of addition under otherwise identical conditions. Where the Q group contains an acrylic or methacrylic acid ester e.g. as in 3 - (tri ethoxy silyl - propyl) methacrylate or its corresponding tri methoxy analogue, 10–30% of the SH groups of polysulphides of molecular weight 4,000 to 8,000 can be reacted by heating at 80°–120°C for about 4 hr with an amount of silane in the molecular ratio to thiol of 0.15 : 1 to 0.30 : 1 in the presence of 0.001 to 3% of sodium methoxide catalyst. Where the Q group contains an epoxide group, e.g. as in 3 - glycidoxy - 1 - (trimethoxysilyl) propane, 15–20% of the SH groups of polysulphides of molecular weight 6,000 can be reacted at 80°–120°C for 2–3 hr. with a molar ratio of silane to thiol in the polysulphide of about 0.2 : 1 in the presence of 0.001–3% tertiary amine catalyst e.g. 2,4,6 -tris (dimethylaminomethyl) - phenol or N,N - dimethyl benzylamine. Alternatively where Q is an epoxide or acrylic or methacrylic ester group the reaction can be carried out at room temperature by standing for a longer period, the other conditions being the same.

Preferably from 5–20% of SH groups of the polysulphide and especially 3–15% are reacted with the silane. Compounds produced by the above process can undergo crosslinking when exposed to moisture. The present invention also provides a sealant composition contained in a water impermeable pack, which composition comprises a polysulphide reacted with a silane as described above, and a solid filler and optionally at least one of a plasticiser and a curing catalyst. Often it also desirably contains an inhibitor and possibly pigments and/or thixotropic agents.

Formulations according to the invention normally contain from 10 to 60% e.g. 20–45% especially 25–35% by weight of the polysulphide prepared by the process of the invention.

Normally they also comprise both a filler and a plasticiser, although the proportion of either can be as little as 10% of the total formulation. Normally, if the content of filler is low, that of plasticiser is high, and vice versa. We have found that a composition containing silicon-modified polysulphide polymer, filler and plasticiser in the weight ratios 0.5–1.5 : 0.5–1.5 : 0.5–1.5 is particularly useful. The weight ratio of filler to plasticizer is often 0.8–1.6 : 1. Preferred amounts of filler are 30–40 % based on the weight of the formulations, while preferred amounts of plasticizer are 20–45% by weight based on the weight of the formulation. Suitable fillers for use in the compositions of the invention include chalk, other forms of calcium carbonate, lithopone, silica of various forms, zinc oxide and clay, titanium dioxide, slate powder, carbon black and barium oxide. Calcium carbonate may often be employed in a coated form, for example in the form of fine particles coated with stearic acid.

Plasticizers which can be of use include nitrated aromatic compounds, chlorinated liquid paraffins, chlorinated poly phenyl is e.g. terphenyls, and phthalates and other ingredients commonly known as plasticisers. Specific compounds which may be employed include: those known under the trade names "Cereclors", and "A roclors", nitrobiphenyls, dibutylphthalate, di-2-ethylhexylphthalate and dialkylphthalates. Triarylphosphates may also be employed.

Pigments, which may be included in some cases, may also act as fillers, such as titanium dioxide and carbon black, in which case they are present in an amount sufficient, either by themselves or in conjunction with other fillers, to fulfil their filling role. However, if desired other pigments may also be included in the formulation in lesser amounts simply in order to provide a colouring effect. Such pigments include many of those commonly used in the paint industry, to achieve various colours.

Very finely divided materials may also be present in small amounts, e.g. up to 8% by weight (e.g. 0.1–8% especially 0.5–2%) of the polysulphide polymer in order to act as thixotropic agents. Such compounds include colloidal silica, bentone, carbon black and crysotile asbestos.

Catalysts which can be used in the present formulations are those which will promote the cross linking of alkoxy silyl groups (or other Si-hydrolyzable groups) in the presence of moisture, but which are unreactive towards free — SH groups on the polysulphide.

Examples of such catalysts are titanium compounds of formula

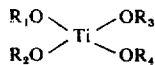

wherein each of $R_1$, $R_2$, $R_3$, and $R_4$ which are the same or different, represents an alkyl group of 1 to 18 carbon atoms, preferably of 1–6 carbon atoms, especially i-Propyl or n-butyl, or a phenyl group, or one or two of the groups $OR_1$, $OR_2$, $OR_3$, and $OR_4$ represent enolate groups from B - dicarbonyl compounds or B - hydroxycarbonyl compounds preferably B - diketones, B -ketoesters, B - hydroxy - aldehydes and B - hydroxy ketones, or at least one pair of the pairs $R_1$ and $R_2$, and $R_3$ and $R_4$, combined represents an aliphatic diradical, which is an alkylene radical of 1–18 carbon atoms, preferably 3–10 carbon atoms and especially 1,6-hexylene, or a diradical consisting of said alkylene radicals bridged by at least one of O, —N—, $NR_5$ and S atoms, in ether, amine or thio ether linkages, or three or four of $R_1$, $R_2$, $R_3$, $R_4$, combined represent an aliphatic tri or tetraradical, which consists of saturated hydrocarbyl groups or saturated hydrocarbyl groups bridged by at least one of O, N, $NR_5$ and S atoms in ether, amine or thioether linkages, and $R_5$ represents hydrogen or alkyl of 1–6 carbon atoms e.g. methyl. Polymers of these titanium compounds can also be used. Examples of titanium compounds in which R–$R_4$ are alkyl or phenyl groups are tetraisopropoxy, titanate, tetrabutyl titanate and tetraphenyl titanate; polymers of such tetra alkoxy titanates may be used. Preferred enolate groups in the titanium compounds are those from compounds of formula $R_6COCHR_7COR_8$ wherein each of $R_6$ $R_7$ and $R_8$, which are the same or different, represents hydrogen an alkyl group of 1 to 6 carbon atoms e.g. methyl or a phenyl group, and $R_8$ and/or $R_8$ can be alkoxy of 1 to 6 carbon atoms e.g. methoxy or ethoxy. Examples of these B-dicarbonyl compounds are acetylacetone, acetoacetic esters such as ethyl aceto acetate and dibenzoylmethane, other preferred enolate groups are those from B-hydroxy compounds of formula $R_9$ $R_{10}$ C(OH) — $CR_{11}$ $CR_{12}$ CO $R_{13}$ where each of $R_9$, $R_{10}$, $R_{11}$, $R_{12}$, and $R_{13}$, which are the same or different represents a hydrogen atom or alkyl group of 1 to 6 carbon atoms e.g. methyl, $R_{13}$ may represent a group of formula $CR_{11}$ $R_{12}$ — C(OH) $R_9R_{10}$, and $R_9$ $R_{10}$C — $CR_{11}$ $R_{12}$ may together form a benzene ring. Examples of such β-hydroxy compounds are diacetone alcohol and salicylaldelyde. Examples of titanium compounds with pairs of $R_1$ and $R_2$ or $R_3$ and $R_4$ joined are bis 1.6. hexylene titanate and dibutyl 1.6. hexylene titanate. The diradicals containing alkylene groups and O, N, $NR_5$ or S atoms can be of formula — $O(CH_2)_n$—, —$(CH_2)_n$ $(CH_2)_n$ $NH(CH_2)_n$ — or —$(CH_2)_n$ S $(CH_2)_n$ —, where n is an integer of 2 to 4 especially 2. The tri or tetra radicals containing C and H and O, N, $NR_5$ or S atoms are usually aliphatic based on alkylene groups optionally bridged by the hetero atoms; examples are radicals of formula —$[(CH_2)_n]_3N$ where n is an integer of 2 to 4 especially 2, as in isopropyl (triethanolamine) titanate.

Preferred titanium compounds are tetra isopropyltitanate, di isopropyl titanium di(acetyl acetonate), tetra butyl titanate, dibutyl -1,6hexylene - titanate, diisopropyl titanium di(ethyl acetoacetate), triisopropyl titanium ethyl acetoacetate and tri iso propyl titanium acetyl acetonate.

The amount of catalyst added can vary from 0.1–10% based on the weight of polysulphide but is usually 0.5–4% especially about 2%. Although if the materials are very thoroughly dried before packaging and the packages themselves are moisture free, or if desiccant type fillers such as barium or calcium oxides are employed, it may be possible to produce effective formulations which do not contain hydrolysis inhibitor, we have found that the use of such a material is normally desirable for increasing storage stability.

Suitable inhibitors are silicon compounds capable of reacting with moisture more readily than the silicon containing moieties attached to the polysulphide chain. Thus the inhibitor employed will depend on the nature of that moiety. As a guide we can indicate that compounds having four identical hydrolysable groups are more reactive to water than those having three of the same groups and that those having three such groups are more reactive than those having two of the same groups.

The order of reactivity with water of some hydrolisable groups bound to silicon in the inhibitors is

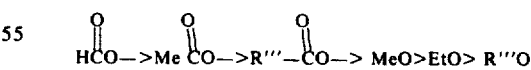

where R''' is an aryl or alkyl group other than a methyl or ethyl group. It is of course possible to employ other hydrolisable groups if their reactivity with moisture is sufficient, for example amino-, nitrilo-, isocyanato-, or mercapto-silyl compounds may be employed. It is of course also possible to have two or more different hydrolisable groups in the same compound. The remaining valencies of silicon in the inhibitor compound are satisfied by inert non - sterically hindering groups such as alkyl groups of 1 to 6 carbon atoms e.g. methyl groups.

Generally the silane inhibitor has the formula $$Z_{n'}Si(OZ')_{4-n'}$$

where $n'$ is 0, 1 or 2, Z is hydrogen or alkyl e.g. of 1 to 6 carbon atoms preferably 1 or 2 carbon atoms or aryl e.g. aromatic hydrocarbyl of 6–19 carbon atoms such as phenyl, naphthyl or tolyl, and $Z'$ is as defined for Z or is acyl of 1 to 8 carbon atoms, e.g. formyl or alkanoyl of 2 to 4 carbon atoms such as acetyl.

Examples of the silane inhibitor are methyltrimethoxysilane, ethyltrimethoxysilane, methyltriacetoxysilane, ethyltriethoxysilane, methyltriethoxysilane, ethyltriacetoxysilane and dimethyldiacetoxy silane.

Normally the inhibitor is present in an amount of from up to 10% by weight such as 0.1–10%, preferably 0.5 to 5 and 0.5–3%, especially 1 to 3% by weight based on the weight of polysulphide.

Other desiccant materials such as calcium or barium oxides can be used in place of the silane in comparable amounts but this use is not preferred.

The water impermeable pack can be made from any convenient material, such as a metal, for example aluminium, a plastics material such as polyethylene, polypropylene and polyvinyl chloride, aluminium foilcoated cardboard, or polymer coated aluminium. The container can be of any convenient shape, for example it may be a simple tube similar to a toothpaste tube, a sachet or a cartridge. If a cartridge is employed this will normally be fitted with a moveable piston in order to eject the sealing composition from it. The cartridge also requires a nozzle, or means of fixing one. This might be done by having a tight fitting screw cap, a foil membrane, a closed tube which is cut when required for use, or simply a moulded projection with external screw threads, which projection is pierced and a nozzle added as required or any combination of these. These are manufactured by BXL "Cascelloid", Schieferdecker K. G., Metal Box Co., Pyles (Kent Moore Division) and many others.

It is essential that the sealant material be substantially anhydrous before being packed in a water impervious pack or alternatively that sufficient hydrolysis inhibitor be present in the pack to remove the water. The sealant can be rendered substantially anphydrous by azeotroping the composition with a suitable solvent, e.g. toluene. The azeotroping and reaction of the silicon compound with the polysulphide may be carried out as one operation if a suitable solvent for the reaction is employed, for example using toluene. If this is done then the reaction mixture is simply heated to the azeotropic distillation temperature after completion of the reaction. Alternatively the silicon compound can be first reacted with the polysulphide and the remaining ingredients excepting the crosslinking promotor admixed with it prior to azeotroping, so long as the water is substantially removed before it reacts with the reaction product of the silane and polysulphide.

In a preferred form the sealant packs of the present invention are prepared by first mixing the polysulphide polymer, which has been reacted with silicon - containing compound, with dried filler and/or plasticiser and/or pigment and/or thixotropic agent. Normally this drying is accomplished by making a slurry of the filler and/or plasticiser and/or pigment and/or thixotropic agent in a water - immiscible organic solvent, such as benzene, toluene or xylene. This is then azeotropically distilled for a period of up to 12 hours in order to remove any water present.

The dried filler etc-containing slurry is mixed with the polymer and the organic solvent removed normally initially by boiling off at an elevated temperature and the removal being completed by vacuum distillation at about 70°–80°C. When it is considered that the system is sufficiently solvent free the final mixing and packaging operations are carried out.

Many other procedures for producing dried fillers etc. exist, for example, extended drying at elevated temperature with or without the application of vacuum, the use of desiccant fillers as indicated earlier, in fact any procedure capable of producing substantially dry materials may be gainfully employed. Similarly the blending of such dried fillers with the modified polymers may be carried out by a variety of standard mixing procedures, such as Z and Σ blade mixers, ball mills, 2- or 3-roll mills and such specialist mixing systems as are available commercially. Although we have found it advantageous to exclude moisture rigorously by performing such operations either under a dry nitrogen blanket or in substantially air-free conditions, suitable mixtures may be produced under less strigent conditions, provided that at a later stage sufficient inhibitor is added. The dried filler etc. and polymer mixture is then rendered suitably solvent-free, normally by distillation at elevated temperature finally under high vacuum at 70°–80°C. When the system is considered to be solvent free the final mixing and packaging operations are carried out. The drying and blending procedures which avoid the use of solvents may of course be taken directly to this last stage, and this procedure is preferred for large scale production.

The inhibitor and catalyst may then be mixed in to the silanized polysulphide. In a typical procedure on a small scale the vessel containing the mixture of dried fillers etc. and polymer was transferred under a nitrogen blanket to a mixer/packager and a plate, containing an orifice, which may be plugged, was lowered to the sealant surface thus preventing ingress of air and/or moisture. Inhibitor is then added, in the preferred procedure the inhibitor is injected from a large syringe into the sealant matrix and then a short mixing cycle is initiated after plugging the orifice. This procedure avoids exudation of inhibitor around the seals. After mixing, the catalyst may be added either by a similar procedure or directly to the sealant surface. The orifice is then plugged and a full mixing cycle commenced (ca.10 min). Packaging is then carried out by lowering the plate into the sealant matrix and, by means of suitable assemblages, directing the exuding mixture into the desired package, again with attention being paid to the exclusion of air and/or moisture. Many commercially used or available systems exist which are suitable, or may be suitably modified, to carry out the above mixing and packaging operations. The quantity of inhibitor required will depend on the dryness and amount of drying carried out on the ingredients.

The cured products obtained from the silanized polysulphide of the invention can be used as sealants e.g. as building sealants and have an extensibility, by 50%–200% preferably 70–150% and especially 100–150%, though 50–120%, especially 70–120% may be suitable for some uses. The extensibility is, measured, during elongation at 6/ mm min of a sample 50 × 12 × 12 mm, which has been cured by exposure to moisture for 7 days at 20°C and 50% RH. The conditions of curing and testing are basically those described in BS 4254, SMC5 or Fed. Spec TT-S-00230C. The cured products also have a recovery after 5 minutes extension by 50–200% of at least 75% often at least 90%, measured 1 hr. after release of the extending force.

To obtain a cured product having the desired extensibility and recovery in any particular case the following major factors affecting the extensibility and recovery must be considered: the number of hydrolysable groups in the silane; the size of f and c in the polysulphide; the nature of the repeating groups in the polysulphide; the number of SH groups in the polysulphide which are reacted with silane; the amount of hydrolysis inhibitor e.g. silane present in the sealant formulation; and to a lesser extent the amount and nature of fillers and plasticizers in the sealant formulation. The influence of each of these factors taken in isolation is in general as follows.

An increase in the number of hydrolysable groups in the silane from two to three increases the number of sources of cross-linking and thereby decreases the extensibility of the cured product. An increase in f in the polysulphide increases the number of potential cross-linking sites, thereby decreasing the extensibility of the cured product. An increase in c means that the number of cross-linking sites in a cured molecule of constant molecular weight is reduced because there is more linear chain in the molecule, and, therefore, the extensibility increases. There is, however, a limit on the value of c for each repeating unit beyond which the silanized polysulphide cannot be used as a sealant as it is no longer "gunnable"; for repeating units of formula $CH_2CH_2OCH_2OCH_2CH_2SS$ the limit is about 85 (i.e. a molecular weight of about 14000). The more flexible the repeating unit c the greater is the extensibility of the cured product; thus a repeating unit of $CH_2CH_2OCH_2OCH_2CH_2S_2$ gives a more extensible product than that from a unit of $CH_2CH_2S_2$ and a unit of $CH_2R_bCH_2S_3$ gives a more extensible product than one from a $CH_2R_bCH_2S$ unit. An increase in the percentage of SH groups in the polysulphide reacted increases the number of sources of cross-linking and thereby reduces the flexibility of the cured product. An increase in the amount of hydrolysis inhibitor in the formulation can, if sufficient inhibitor is added, reduce the amount of curing that can take place in the seven day test period because moisture causing curing reacts preferentially with the inhibitor and, only when the latter is consumed,, can significant curing of the polysulphide occur. If very large amount of filler are present in the formulation the extensibility is reduced and if very large amounts of plasticizer are present the recovery is reduced.

For the polysulphides of formula

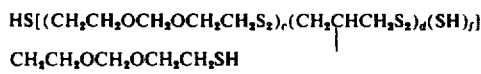

satisfactory extensibility is generally achieved, for a dimethoxy silane reactant with c in the range 40 to 84, f in the range 0 to 0.2 and 4 to 12% of the SH groups reacted, and, for a triethoxy silane reactant, with c in the range 40 to 84, f in the range 0 to 0.2 and 3 to 11% of the SH groups in the polysulphide reacted. Silane reactants with two hydrolysable groups will behave in a similar fashion to the dimethoxy silane and silane reactants with three hydrolysable groups will behave in a similar fashion to triethoxy silanes. Examples of the dimethoxy silane and triethoxy silane reactants are dimethoxy methyl vinyl silane and vinyl triethoxy silane.

The invention is illustrated in the following Examples. The "gunnability" of a composition referred to therein is a measure of the fluidity of the mixture which is made by "gunning" material from a standard caulking gun through a standard nozzle for a fixed time under a fixed gas pressure. The conditions we use are as follows: Nozzle 2 inches × 1/8 inch diameter at 50 psi for 1 minute, several measurements are made and an average value is recorded. This process may be repeated over several months as a measure of storage stability.

A polysulphide formula

means that there are c and d repeating units which can be joined in any order with the d SH groups attached to the free valencies, whether those occur on the d unit or on the end of one or more of the c units or both.

In the Examples the following trade names are used, Calofort S, Aerosil 300, Aroclor 6062, Cereclor 56L and Cereclor 63L and 65L. Calofort S is the trade name of J. & E. Sturge Ltd for calcium carbonate particle size 0.1 μ coated with 3% stearic acid. Aerosil 300 is the trade name of Degussa for fumed silica. Aroclor 6062 is a trade name of Monsanto for a chlorinated polyphenyl. Cereclor 63L, 65L and 56L are trade names of ICI for chlorinated liquid paraffins.

The titanium dioxide used in the Examples was Runa RP grade of Laporte Industries.

EXAMPLE 1

A mixture of 100 g. of an anhydrous polysulphide polymer with an -SH equivalent of 2,780 being essentially of the statistical composition

was reacted with 3 g. of vinyl methyl dimethoxy silane at 100°C for 24 hrs. At this stage analysis showed that 83.5% of the SH groups remained unreacted.

A sample (30 g.) of this polymer was compounded with the following ingredients, the mixing being done on a 3 roll mill.

| | |
|---|---|
| Above polymer | 30 g. |
| Calofort S | 21 g. |
| Titanium dioxide 'Runa RP' | 4.5 g. |
| Aerosil 300 | 0.75 g. |
| Aroclor 6062 | 17 g. |
| Diisopropyltitanium diacetyl acetonate | 0.6 g. |

The material was gunned into test pieces as described in BS 4254, SMC 5, or Fed. Spec. TT-S-00230C and the material was allowed to cure for 7 days at 20°C and 50% RH. The test pieces were then extended at 6 mm/min. by 100% of their original width, a force of 17½ lbs. being required. The samples were held at this elongation for 5 minutes, during which time the force required to hold them fell to 13½ lbs. They were then removed from the jaws of the tensometer and immediately a relaxation of 85% was observed. After 1 hr. this relaxation was 100%.

EXAMPLE 2

A mixture of 100 g. of an anhydrous polymer with an -SH equivalent 2190 of the statistical composition

known as Thiokol LP-12, and 5 g. of vinyltriethoxysilane was heated at 120°C for 24 hrs. Analysis of this product shows that 89.2% of the -SH groups remained unreacted.

This material was formulated as follows

| | |
|---|---|
| Polymer | 30 g. |
| Calofort S | 21 g. |
| Titanium dioxide | 4.5 g. |
| Aerosil 300 | 0.75 g. |
| Arochlor 6062 | 17 g. |
| Diisopropyltitanium diacetyl acetonate | 0.6 g. |

The material was gunned into test pieces as described in BS 4254, SMC-5 or Fed. TT-S-00230C and the material allowed to cure for 7 days at 20°C and 50% RH. They were extended at 6 mm/min. by 50% of their original width, a force of 12 lbs. being required, and held at this elongation for 5 mins, the force dropping to 9½ lbs. They were then removed from the jaws of the tensometer and an immediate relaxation of 80% was noted. This relaxation increased to 100% after 1 hour.

EXAMPLE 3

A mixture of an anhydrous polymer with an -SH equivalent of 2735 of the statistical composition

and 5 gms. vinyl tri-ethoxysilane was heated at 120°C for 24 hrs. Analysis of this product showed that 94.6% of the -SH groups remained unreacted.

This material, when formulated and tested as in Example 1 gave a rubbery material which extended by 50% at a force of 15 lbs. per square inch.

The material was held at 50% elongation for 5 minutes during which time the force dropped to 13 lbs. On being released an instantaneous recovery of 90% was observed; recovery was 100% after 1 hour.

EXAMPLE 4

A mixture of 100 g. of Thiokol LP-2

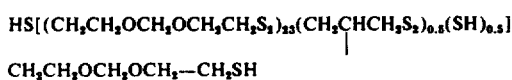

and 100 g. of toluene were azeotropically distilled for 2 hours to remove water; then 5 g. of $CH_2=CH-Si(OC_2H_5)_3$ (Union Carbide product A151) were added and the mixture boiled under reflux for 30 hrs. The amount of silane was sufficient to add to 50% of the end groups if all silane reacted. The product was stripped at 1 mm at 100°C to remove toluene and unreacted silane. Analysis showed that the polymer contained 0.44% silicon equivalent to 60% addition (i.e. 30% of SH groups had reacted).

To 100 g. of the residue, 60 g. of calcium carbonate coated with 3% calcium stearate and 2 g. of tetraisopropyltitanate and 1 g. of methyl trimethoxy silane was added, the ingredients being compounded on a 3 roll mill. A portion of the mixture was gunned into test pieces 50 × 12 × 12 mm as described in BS 4254, SMC-5 or Fed. TT-S-00230C, and cured within 7 days at 20°C and 50% RH to a rubbery non-tacky product, which could be extended at 6 mm/min by 50% of its original length, a force of 12 lbs. being required. After 5 mins. of this elongation an instantaneous recovery of 90% was observed.

The remainder of the sample was stored in a sealed flask, and found to be in a paste-like state after 2 months.

EXAMPLE 5

The process was carried out as in Example 4 but during 30 hrs. 0.1 g. benzoyl peroxide was added every 4 hrs. The product was formulated as in Example 4 and cured within 7 days to a rubberlike material with properties identical to those of the material of ex. 4 viz - 50% elongation needed 12 lbs. force and recovery was 90%.

EXAMPLE 6

The process of Example 4 was repeated using as silane 3(-triethoxysilyl-) propylmethacrylate 5 g., plus 1 g. of a 20% solution of sodium methoxide in methanol.

The mixture was stirred for 4 hours at room temperature and then stripped at 0.2 mm at 50°C to remove toluene and unreacted silane. Analysis of the product showed that 84.8% of the SH group remained unreacted.

The product can be mixed with the same fillers and titanates in the same amounts as in Ex. 1 and cured for 7 days at 50% RH and tested as before.

At 50% elongation a force of 9 lbs. was observed and instantaneous recovery was 85%.

EXAMPLE 7

400 g. of a polysulphide of molecular weight about 7,200 of formula

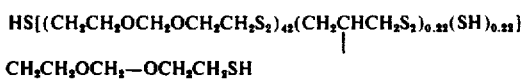

known as Thiokol LP-31 was reacted with 20 g. of methyl vinyl dimethoxy silane for 16 hrs. at 100°C resulting in 10.5% SH groups blocked. The product was mixed by hand with 280 gms. of "Calofort S", 64 gms. titanium dioxide, 232 gms. of "Aroclor" 6062 and 10 gms. of "Aerosil 300", the materials having been previously dried by azeotropic distillation followed by removal of solvent. The resulting stiff paste was then further mixed on a Semco mixer/packager with inhibitor (8 gms. of methyl trimethoxy silane, 2% wt. on polymer) and catalyst (8 gms. of di-isopropyl titanium (IV) acetyl acetonate, 2% by wt. of polymer weight.

| Initial gunnability | = | 8.6 gms./min. |
|---|---|---|
| after 31 days | = | 6.5 gms./min. |
| after 59 days | = | 2.7 gms./min. |

Samples of the packed material were gunned into test pieces to give 50 × 12 × 12 mm. samples, between glass or aluminium plates. The test pieces were cured at 50% RH and 20°C for 7 days. They then elongated at 6 mm/min. by 50% of their original width, a force of 15 lbs. being required. An instantaneous recovery of 90% was observed after being held at this elongation for 5 minutes.

EXAMPLE 8

A mixture of 350 gms. "Calofort S", 80 gms. titanium dioxide, 290 gms. "Aroclor 6062", 12 gm. "Aerosil 300" and 1½ liters of toluene was stirred under reflux for a total of 10 hours with periodic removal of water via a Dean and Stark trap. To this slurry was added 500 gms. of a silane modified polysulphide as in Example 7 and the solvent was then stripped off, finally under high vacuum (0.5 mm. Hg.) at up to 100°C in a stainless steel vessel. The resulting product was thick paste. Inhibitor (10 gms. =2% wt. on polymer, of methyl trimethoxy silane) and catalyst (10 gms. =2% wt. on polymer, of di-isopropyl titanium acetyl acetonate) were then added to "pockets" made in the sealant and a 10 minute mixing cycle was initiated. The product was then packaged as described earlier and gunnability tested:

| Initial gunnability | = | 10.7 gms./min. |
|---|---|---|
| after 28 days | = | 7.2 gms./min. |
| after 63 days | = | 4.8 gms./min. |

Samples of the packaged material were gunned into test pieces as described in BS 4254 and cured for 7 days at 50% RH.

The test pieces were elongated at 6 mm/min. to give a 50% extension, the force required was 12 lbs. Over a 5 min. period this fell to 11 lbs. After this time the sample recovered by 100% instantaneously.

EXAMPLE 9

A slurry of 1,400 gms. Calofort S, 320 gms. titanium dioxide, 1,160 gms. Aroclor 6062 and 48 gms. of Aerosil 300 in 5 liters of toluene was refluxed for a total of 10 hours with periodic removal of water collected in a Dean and Stark trap. To this slurry 2,000 gms. of a silane modified polysulphide as in example 7 was added and the solvent removed by application of heat and vacuum, finally at high vacuum (0.5 mm. Hg.) and up to 100°C. This latter stage may be performed in a vessel suitable for the remaining steps of the procedure. Stirring of the resultant mixture may prove desirable to assist removal of the solvent from the lower part of the vessel. The vessel was then transferred under a $N_2$ blanket to a Semco Mixer/Packager and to the mixture was added 40 gms. of methyl trimethoxy silane inhibitor and a 4 minute mixing cycle initiated. Then 40 gms. of di-isopropyl titanium (IV) acetyl acetonate catalyst were added and a 10 minute mixing cycle initiated.

When the mixing cycle was completed packaging was commenced by orthodox procedures, care being taken to minimise contact with the atmosphere. A variety of packages were filled and retained for regular testing of latency. Gunnability was measured as above giving an

| Initial gunnability | 30 gms./min. |
|---|---|
| After 1 year | 26 gms./min. |

Samples were gunned into test pieces as described in BS 4254 and cured for 7 days at 20°C and 50% RH. They were then extended by 50% of their original length, a force of 10 lbs. being required. This fell to 8½ lbs. over 5 minutes, and an instantaneous recovery of 95% was observed.

EXAMPLE 10

A similar procedure to Example 9 was carried out substituting 20 gms. of methyl trimethoxy silane inhibitor for the 40 gms. of the same inhibitor in that Example. A mixture was obtained with initial gunnability of 12.3 gms./min. measured as described under Example 8.

| 6 months gunnability | 10.4 g./min. |
|---|---|
| Samples were gunned into test pieces and cured and tested as before. | |
| Force at 50% elongation | 18 lbs. |
| After 5 mins. | 17 lbs. |
| Instantaneous recovery. | 100% |

EXAMPLE 11

500g (0.07M) of a polysulphide of the formula

known as Thiokol LP 31 was mixed with 25g (0.13M) of vinyltriethoxy silane and the mixture was warmed to 100°C for 12 hrs. Analysis showed that 5.4% of the SH groups were blocked.

EXAMPLE 12

500g (0.07M) of a polysulphide of the formula

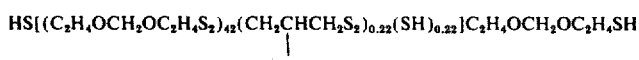

known as Thiokol LP31 was mixed with 500g of toluene. The mixture was boiled under reflux for 2 hrs. during which time water (0.5ml) was removed, via a Dean & Stark trap. Vinylmethyldimethoxy silane (25g 0.18M) was added and the mixture refluxed for 14 hrs. Analysis showed that 7.2% of the SH groups had reacted.

EXAMPLE 13

500g (0.05M) of a polymer of the formula

made by the method described by Eugene R. Bertozzi in Rubber Chem. Tech. 41 pp 114–160 1968 was dissolved in 500g of toluene and boiled under reflux for 1 hr. Water 0.5 mls was removed by a Dean & Stark trap. Vinyltriethoxysilane (25g 0.13M) was added, together with sulphur (2.5 g). The solution was boiled under reflux for 12 hrs. Analysis showed that 5.6% of the SH groups were blocked.

EXAMPLE 14

500g (0.05M) of polymer of the formula

prepared by the method described by Eugene R. Bertozzi (loc. cit) was mixed with toluene 500mls and the mixture boiled under reflux for 4 hrs. Water (0.2mls) was removed by a Dean & Stark trap. To this solution sulphur (2.5g) and vinylmethyldimethoxysilane (25g 0.17M) were added. The mixture was boiled under reflux for 20 hrs. at which time analysis showed that 8.4% of the SH groups were blocked.

EXAMPLES 15–16

In a similar manner to that given in Examples 11–14 the following reactions were carried out

| Examp. No. | Polymer | Wt.g. | Silane | Wt.g. | Solvent (ml.) | Temp. °C | Time Hrs. | % SH blocked |
|---|---|---|---|---|---|---|---|---|
| 15 | LP-32 | 500 | Vinyltriethoxy | 25 | none | 100 | 12 | 4.2 |
| 16 | LP-31 | 500 | Vinylmethyldiethoxy | " | nil | 100 | 14 | 4.9 |

EXAMPLE 17

500 g. (0.07M) of a polysulphide polymer of the formula

known as Thiokol LP-31 was mixed with 25 g. (0.08M) of 3-(triethoxysilyl) propylmethacrylate at 40°C. The mixture was stirred until homogeneous -(2½ hours) and sodium methoxide in methanol (0.1 g. of a 10% w/w solution) was added. The mixture was stirred for 4 hours. Analysis showed that 10.5% of the SH groups had reacted.

EXAMPLE 18

500 g. (0.07M) of a polysulphide polymer of the formula

was mixed with 10 g. (0.04M) of 3-(trimethoxysilyl) propylglycidyl ether and 0.3g. of trisdimethylaminomethyl phenol. The mixture was warmed to 100°C for 4 hrs. Analysis showed that 18.4% of the SH groups were blocked.

Filler and Plasticiser mixtures

| Mixture A | | |
|---|---|---|
| | Calofort S | 350g. |
| | Titanium dioxide | 80 g. |
| Mixture B | | |
| | Aerosil 300 | 12g. |
| | Aroclor 6062 | 290g. |
| Mixture C | | |
| | Calofort S | 350g |
| | Titanium Dioxide | 80g |
| | Aerosil 300 | 12g |
| | Cereclor 56L | 500g |
| Mixture D | | |
| | Titanium Dioxide | 250g |
| | Calofort S | 200g |
| | Cereclor 63L | 500g |
| | Carbon Black | 10g |
| | Calofort S | 500g |
| | Aroclor 6062 | 450g |
| | Aerosil 300 | 12g |

EXAMPLE 19

In Examples 19–25 the quantity of materials used are the whole quantities given in previous examples 11–18. The filler and plasticiser mixture A was slurried in toluene. It was boiled under reflux for 6 hrs. Water, 2 ml. was removed by a Dean and Stark trap. The polymer from Ex. 12 still in toluene solution was added, and the whole mixture stripped in vacuo to remove toluene until the material could just be poured. The mixture was then transferred to a stainless steel vessel, which could be fitted on a Semco mixer/packager (Model 272K with a strengthened quart size pot). Stripping was continued to 100°C and 1mm. The vessel was cautiously opened under a nitrogen blanket, placed on the Semco mixer and methyltrimethoxysilane 5g was added. The vessel was closed and the material thoroughly mixed. The vessel was again opened as before and diisopropyltitanium diacetylacetonate 10g was added. The vessel was again closed and the material mixed for about 10 minutes. The sealant was put into cartridges (supplied by Schieferdecker "Nippekart"), heat sealed plastic coated aluminium sachets and toothpaste tubes. These were stored under ambient conditions and tested as follows:

Examples 22–25

Similarly were prepared and tested:-

| Ex. | Polymer from Example | Fillers Mixture | Method of Drying | Inhibitor | % by wt. | 3 months gunnability | after 7 days |||||
|---|---|---|---|---|---|---|---|---|---|---|---|
| | | | | | | | Ultimate elongation | 50% Force or Break newtons | | Recovery 50% | 100% |
| 22 | 13 | B | Azeotropically | Methyl trimethoxy silane | 1 | 76% | 65% | 73 | 85 | 100 | — |
| 23 | 13 | C | In toluene | " | " | 83 | 55 | 92 | 102 | 100 | — |
| 24 | 16 | A | " | " | " | 95 | 100 | 10 | 21 | — | 100 |
| 25 | 17 | A | " | " | " | | 50 | | 88 | 95 | — |

1. Cure and recovery

Samples were made into test pieces of size 50 × 12 × 12mm as described in BS 4254 or SMC-5. These samples were placed in an atmosphere of 50% RH and ambient (20°C) conditions and allowed to cure. After 3 days the support blocks were removed and after 7 days the test piece was placed in the jaws of a tensometer and elongated at 6 mm/min. Maximum elongation was 75% at which point the sample failed cohesively. Samples elongated to 50% showed an instantaneous 95% recovery. The force required to achieve this elongation was 104 newtons.

2. Gunnability.

After 3 days storage a cartridge was opened and placed in an air pressure operated sealant gun. The pressure was set at 50 psi and a standard nozzle was fitted to the cartridge. The weight extruded in 1 min. was measured 10 times, and the results averaged. After 3 months the test was repeated, and it was found that the material retained 59% of its original gunnability.

EXAMPLE 20

The filler and plasticiser mixture D was dried in a vacuum oven at 110°C and 20 mm. pressure for 24 hrs. It was then combined with the polymer from Example 11, and mixed on a Semxo mixer. To the mixture was added methyl trimethoxysilane as inhibitor (5 g.) which was thoroughly mixed in before diisopropyltitanium diacetylacetonate 10 g. was added. The material was again thoroughly mixed and put into cartridges.

It was tested as in Example 19 giving the following results:

| | |
|---|---|
| 3 months gunnability | 62% |
| Ultimate elongation | 55% |
| Force at 50% | 76 newtons |
| Recovery after 1 hr. | 100% |

EXAMPLE 21

The filler mixture B was slurried in toluene (11) and boiled under reflux for 8 hrs. Water 3 ml. was removed via a Dean and Stark trap. This slurry was mixed with the polymer from Example 14 and the material then treated in a manner identical to Example 19. The following results were obtained:

| | |
|---|---|
| 3 months gunnability | 68% |
| Ultimate elongation | 110% |
| Force at 100% | 93 newtons |
| Recovery from 100% after 1 hr. | 100% |

EXAMPLE 26

A solution of 100g. of

$$HS[(CH_2CH_2OCH_2OCH_2CH_2SS)_{50}(CH_2CHCH_2SS)_{0.1}(SH)_{0.1}]CH_2CH_2OCH_2OCH_2CH_2SH$$

in toluene (100g) with HS(CH$_2$)$_3$Si(OCH$_3$) (5g.) and 2,4,6 trisdimethyl aminomethyl phenol (1g.) was refluxed for 10 hours. Analysis on the product showed that 10% of the SH group were blocked. Toluene (98g.) was removed and a sample (25g.) of the polymer was compounded with the following ingredients on a 3-roll mill:

| | |
|---|---|
| Calofort S | 17.5g. |
| Titanium Dioxide | 4.0g. |
| Aerosil 300 | 0.6g. |
| Aroclor 6062 | 14.5g. |
| Di-isopropyltitanium diacetyl acetonate | 0.5g. |

The resultant material was a paste with non-slump characteristics. It was gunned into a 50 mm × 12 mm × 12 mm cavity between two aluminium plates and allowed to cure for 7 days at ambient temperature (20°C) and 50% R.H. It was then tested for extension on a tensometer and was found to extend to 50% extension with a force of 8½ lbs. (37 newtons)

I claim:

1. A moisture curable sealant composition maintained under anhydrous conditions and containing unreacted SH groups and in the absence of peroxides or tin compounds, said sealant comprising the product of reacting under anhydrous conditions (i) a polysulphide of the statistical formula

where
$a$ is 1–5,
$b$ is 0 or 1
$c$ is 1–200
$d$ is 0 up to 0.05c,
$f$ is subject to the conditions 0.05c is equal to or larger than $f$, $f$ is equal to or larger than $d$, and $f$ is equal to or less than 1, and $f=d$ multiplied by the (No. of free valencies in R″ −2) R′ is —O—, —S— or an organic divalent radical free of aliphatic unsaturation selected from the group consisting of radicals containing only C and H atoms and radicals containing C and H atoms and at least one of O and S atoms in the form of —C—O—C, —OH or —C—$S_a$—C— links, R″ is an organic radical free of aliphatic unsaturation having at least 3 free valencies and selected from the group consisting of radicals containing C and H atoms only and radicals containing C and H atoms and at least one of O and S atoms in the form of —C—O—C, —OH or —C—$S_a$—C— links, and the free valencies being for carrying all the $f$ SH groups and the $CH_2R'_bCH_2S_a$ and R″$S_a$ groups being in any order, with (ii) an amount of a silane of the formula $Q_nSiX_{(4-n)}$, where $n$ is 1 or 2, Q is an organic group having an epoxide group, an organic group having a mercapto group $CH_2=CR_{14}COO\ C_{m+1}H_{2m+2}-$ or $CH_2=CR_{15}-C_mH_{2m}-$ group, where $m$ is 0, 1, 2 or 3, each of $R_{14}$ and $R_{15}$ which are the same or different, is hydrogen or is an alkyl radical of 1 to 4 carbon atoms, and at least two X's are organic hydrolyzable groups and the remaining group X (if any) is an alkyl group of 1 to 6 carbon atoms, or a chloro alkyl radical of 1 to 6 carbon atoms, the silane having a total of only 1 or 2 groups, which react with SH in the polysulphide under the reaction conditions, sufficient to react with from 3% to 30% of the SH groups of said polysulphide, and the reaction with a silane containing a mercapto group being carried out in the presence of a base of pK at least 9.

2. A composition according to claim 1 wherein the silane is of formula Q $SiX_3$.

3. A composition according to claim 1 wherein R″ is a trivalent radical.

4. A composition according to claim 3 wherein R″ is a

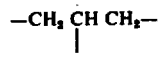

group.

5. A composition according to claim 1 wherein b=1 and R′ is a divalent radical free of aliphatic unsaturation consisting of C and H atoms and at least one of O and S atoms in the form of C—O—C or C—$S_a$—C links.

6. A composition according to claim 4 wherein R′ is a $CH_2OCH_2OCH_2$ radical.

7. A composition according to claim 5 wherein R′ is a $CH_2OCH_2OCH_2$ radical.

8. A composition according to claim 2 wherein Q is selected from groups of formula

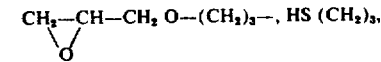

vinyl and $CH_2=C(CH_3)$ — COO $(CH_2)_m=$, wherein $m$ is 0, 1, 2 or 3.

9. A composition according to claim 8 wherein Q is selected from groups of formula $CH_2$—CH—$CH_2$ O—$(CH_2)_3$—, HS $(CH_2)_3$,
\\O/ vinyl and $CH_2=C(CH_3)COO\ (CH_2)_3-$

10. A composition according to claim 9 wherein Q is a vinyl group.

11. A composition according to claim 2 wherein at least 2 groups X are alkoxy groups of 1–6 carbon atoms and any remaining group X is an alkyl group of 1–6 carbon atoms.

12. A composition according to claim 11 wherein 2 groups X are methoxy or ethoxy groups and the remaining group X is a methyl, methoxy or ethoxy group.

13. A composition according to claim 12 wherein the silane is vinyl triethoxy silane or vinyl methyl dimethoxy silane.

14. A composition according to claim 1 wherein 3–15% of the SH groups of the polysulphide have been reacted.

15. A composition according to claim 1 wherein in the polysulphide $f$ is 0.001 –0.2.

16. A composition according to claim 15 wherein in the polysulphide $c$ is 40–85.

17. A composition according to claim 15 which comprises the product of reacting under anhydrous conditions a polysulphide of formula

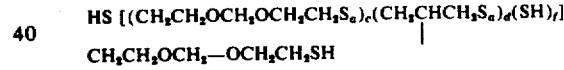

wherein $a$ is 2–3 and $d$ and $f$ are the same and equal to 0.001–0.2 and $c$ is 20–85 with an amount of silane of formula Q $SiX_3$ wherein Q is selected from the group consisting of 3-glycidoxypropyl, 3-mercaptopropyl, 3-methacryloxy-propyl and vinyl groups and two X groups represent methoxy or ethoxy groups and the third X group represents a methyl, methoxy or ethoxy group sufficient to react with 3–15% of the SH groups of the polysulphide.

18. A composition according to claim 1 which comprises the product of reacting under anhydrous conditions a polysulphide of formula

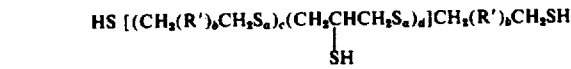

wherein $a$ is 2, 3 or 4, $b$ is 0 or 1 $c$ is 20–50, $d$ is less than 0.05c and an amount of a silane of formula $QSiX_3$, wherein Q is a group selected from a group having a terminal epoxide group, a 3-methacryloxy-propyl group and a $CH_2=CH\ C_mH_{2m}-$ group where m is 0, 1, 2 or 3 sufficient to react with 3–30% of the SH groups of the polysulphide.

19. A composition according to claim 18 wherein R′ is a $CH_2OCH_2OCH_2$ radical.

20. A composition according to claim 19 wherein the silane is selected from the group consisting of vinyl triethoxysilane, vinyl methyl dimethoxy silane, 3-triemethoxy silyl propyl methacrylate and 3 - glycidoxypropyl-1-trimethoxy silane.

21. A composition according to claim 20 wherein the silane has reacted with 5–20% of the SH groups of the polysulphide.

22. A composition according to claim 1 which also contains 0.5–10% by weight of a silane hydrolysis inhibitor of formula $Z_{n'}$ $Si(OZ')_{4-n'}$, wherein n' if 0, 1 or 2, Z is alkyl or aryl and Z' is methyl ethyl or acyl.

23. A composition according to claim 22, wherein the inhibitor is methyl trimethoxy silane or methyl triacetoxy silane.

24. A composition according to claim 18 which also contains 0.5–10% by weight of a silane hydrolysis inhibitor of formula $Z_{n'}$ $Si(OZ')_{4-n'}$, wherein n' is 0, 1 or 2, Z is alkyl or aryl and Z' is methyl ethyl or acyl.

25. A process for preparing a moisture curable sealant composition maintained under anhydrous conditions and containing unreacted SH groups, which process comprises reacting under anhydrous conditions in the absence of peroxides, tin compounds a polysulphide as defined in claim 1 with a silane as defined in claim 1, whereby the proportion of the SH groups of the polysulphide which react with the silane is 3–30%, and the reaction with a silane containing a mercapto group being carried out in the presence of a base of pK at least 9.

26. A process according to claim 25 wherein the silane is of formula $QSiX_3$.

27. A process according to claim 26 wherein R'' in the polysulphide is

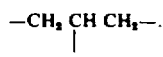

28. A process according to claim 27 wherein R' is $CH_2OCH_2OCH_2$.

29. A process according to claim 26 wherein two of groups X represent methoxy or ethoxy groups and the remaining group X represents a methoxy, ethoxy or methyl group.

30. A process according to claim 29 which comprises reacting under anhydrous conditions a polysulphide of formula

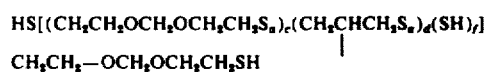

wherein a is 2–3 and d and f are the same and equal to 0.001–0.2 and c is 20–85 with an amount of silane of formula $QSiX_3$ wherein Q is selected from the group consisting of 3-glycidoxy propyl, 3-mercapto propyl, 3-methacryloxy-propyl and vinyl groups and two X groups represent methoxy or ethoxy groups and the third X groups represents a methyl, methoxy or ethoxy group sufficient to react with 3–15% of the SH groups of the polysulphide.

31. A water impermeable pack maintaining under anhydrous conditions a sealant formulation comprising a sealant composition as claimed in claim 1 together with a filler.

32. A water impermeable pack maintaining under anhydrous conditions comprising a sealant composition as claimed in claim 18 together with a filler.

33. A pack according to claim 31 which comprises 10–60% by weight (based on the weight of the formulation) of said sealant composition.

34. A pack according to claim 33 which also contains a plasticizer.

35. A pack according to claim 33 which also contains a moisture curing catalyst which is of formula

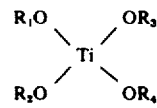

wherein each of $R_1$, $R_2$, $R_3$, and $R_4$ which are the same or different, represents an alkyl group of 1 to 18 carbon atoms, or a phenyl group, or one or two of the groups $OR_1$, $OR_2$, $OR_3$, and $OR_4$ represent enolate groups from β-dicarbonyl compounds of β-hydroxycarbonyl compounds or at least one pair of the pairs $R_1$ and $R_2$, and $R_3$ and $R_4$, combined represents an aliphatic diradical, which is an alkylene radical of 1–18 carbon atoms, or a diradical, consisting of said alkylene radicals bridged by at least one of O, -N-, $NR_5$ and S atoms, in ether, amine or thio ether linkages, or three or four of $R_1$, $R_2$, $R_3$, $R_4$, combined represent an aliphatic tri or tetraradical, which consists of saturated hydrocarbyl groups or saturated hydrocarbyl groups bridged by at least one of O, N, $NR_5$ and S atoms in ether, amine or thioether linkages, and $R_5$ represents hydrogen or alkyl of 1–6 carbon atoms, or a polymer of such a compound.

36. A pack according to claim 35 wherein the catalyst is tetraisopropyl titanate or diisopropyl titanium bis(acetyl acetonate).

37. A pack according to claim 34 wherein the formulation comprises 10–60% by weight of sealant composition, 30–40% of filler and 20–45% by weight of plasticizer.

38. A pack according to claim 33 which also comprises 0.5–10% by weight (based on the weight of the sealant composition) of a hydrolysis inhibitor of formula $Z_{n'}$ $Si(OZ')_{4-n'}$ wherein n' is 0, 1 or 2, Z is alkyl or aryl and Z' is methyl, ethyl or acyl.

39. A pack according to claim 38 wherein the inhibitor is methyl trimethoxysilane or methyltriacetoxysilane.

40. A cured sealant having an extensibility by 50–200% and recovery of at least 75% obtained by treating with moisture a formulation as defined in claim 31.

41. A cured sealant having an extensibility by 50–200% and recovery of at least 75% obtained by treating with moisture a formulation as defined in claim 37.

* * * * *

UNITED STATES PATENT OFFICE
CERTIFICATE OF CORRECTION

Patent No. 3,925,331            Dated    December 9, 1975

Inventor(s) CHRISTOPHER SCOTT ELY

It is certified that error appears in the above-identified patent and that said Letters Patent are hereby corrected as shown below:

Column 7, lines 43, 44, 45; and Column 8, lines 2 and 5; in all occurrences on these lines, replace "B" with $--\beta--$.

Column 9, line 44, correct the spelling of "anhydrous".

Column 21, line 8, replace "D" with --d--.

Column 22, line 6, replace "m=1" with --m+1--.

Signed and Sealed this

Thirtieth Day of November 1976

[SEAL]

Attest:

RUTH C. MASON  
*Attesting Officer*

C. MARSHALL DANN  
*Commissioner of Patents and Trademarks*